(12) United States Patent
DeVries

(10) Patent No.: US 7,465,507 B2
(45) Date of Patent: Dec. 16, 2008

(54) PORTABLE FUEL CELL SYSTEM WITH RELEASABLE AND RECHARGEABLE BATTERIES

(75) Inventor: Peter David DeVries, Spokane, WA (US)

(73) Assignee: Genesis Fueltech, Inc., Spokane, WA (US)

( * ) Notice: Subject to any disclaimer, the term of this patent is extended or adjusted under 35 U.S.C. 154(b) by 531 days.

(21) Appl. No.: 10/945,800

(22) Filed: Sep. 21, 2004

(65) Prior Publication Data

US 2006/0063044 A1    Mar. 23, 2006

(51) Int. Cl.
*H01M 8/04* (2006.01)
*H01M 8/12* (2006.01)
*H01M 10/44* (2006.01)

(52) U.S. Cl. .............................. 429/22; 429/23; 429/34; 429/9; 320/101

(58) Field of Classification Search .................. 429/22, 429/23, 34, 9, 96, 100; 320/101, 127, 135
See application file for complete search history.

(56) References Cited

U.S. PATENT DOCUMENTS

| 5,413,499 | A  | * | 5/1995 | Wright et al. ............... 439/500 |
| 6,441,589 | B1 |   | 8/2002 | Freking et al. |
| 6,624,616 | B1 |   | 9/2003 | Frerking et al. |
| 2004/0104705 | A1 | | 6/2004 | Frerking et al. |

* cited by examiner

*Primary Examiner*—Raymond Alejandro
(74) *Attorney, Agent, or Firm*—Andrus, Sceales, Starke & Sawall, LLP

(57) ABSTRACT

A fuel cell power system has a fuel cell capable of generating electrical power, a battery holder releasably mounting at least one rechargeable battery, and a power controller which receives the electrical power from the fuel cell and distributes the electrical power to an output bus for use by an external load and to the battery for charging the battery. The rechargeable batteries may be easily inserted and removed from the system, with the batteries providing start-up power for the fuel cell power source, as well as surge power when the external electrical load is connected to the power system, or when the load exceeds the capacity of the fuel cell.

6 Claims, 2 Drawing Sheets

PORTABLE FUEL CELL SYSTEM WITH RELEASABLE AND RECHARGEABLE BATTERIES

FIELD OF THE INVENTION

This invention relates to battery charging and power systems in which the primary source of battery charging power is a fuel cell. Rechargeable batteries may be easily inserted and removed from the system, with the batteries providing start-up power for the fuel cell power source, as well as surge power when an electrical load is connected to the power system, or when the load exceeds the capacity of the fuel cell.

BACKGROUND OF THE INVENTION

Fuel cells have become an increasingly viable source of power, with recent technical advances creating smaller, lighter, and more efficient systems. As these power source solutions become technically mature, they will provide novel solutions for field applications. One such application is the utilization of the fuel cell in conjunction with rechargeable batteries. For example, Frerking, et al, in U.S. Pat. Nos. 6,441, 589, 6,624,616, and U.S. patent application Ser. No. 2004/0104705 (hereafter referred to as the Frerking patents), generally describe a portable system and method for recharging secondary batteries. The Frerking patents describe a portable power source (which may include a fuel cell), a battery holder and socket, and circuitry for recharging the battery which includes a supervisory circuit, and a DC-DC converter for maintaining the correct charge state of the battery. In each case the DC-DC converter output is directly coupled to the battery, and means are employed to measure the current during the charging process in order to control the DC-DC converter.

While the Frerking patents disclose a workable system, there are some shortcomings to the utility of such a system. First, in the fabrication of a portable power system, the utility of the device can be greatly increased by adding the capability of using the fuel cell source to supply external power beyond the limited role of recharging batteries. Further, as external loads often have power surge requirements, the batteries in the system could also be used to supply power when the load exceeds the capability of the fuel cell. The batteries could additionally be used to supply start-up power for the fuel cell and, if employed, a fuel processor.

Fuel cell systems which supply power to a load typically employ batteries for start-up and surge capability. However, as these batteries have a limited life span, they may eventually need replacing. This is particularly true for systems such as fuel cell scooters, which may discharge the batteries heavily on a daily basis. Since these batteries must be removed by disassembly of part of the fuel cell power system, a better means for accessing and replacing defective or aged batteries is needed.

SUMMARY OF THE INVENTION

The present invention provides a system for recharging releasably mounted secondary batteries and for providing output power capability to a load external to the system. In one embodiment of the present invention, the device includes a fuel cell, a power controller, and at least one holder having a slot that is adapted to receive a secondary battery. This secondary battery is releasably mounted in the holder so that it may be easily inserted into and/or removed from the system via an access door or hatch. As a result, discharged batteries may be placed into the slot for the purpose of being recharged. Also, batteries which are defective or which have exceeded their useful life may be replaced by removing them from the system through the access door or hatch. The slot includes connector means for attaching the power terminals of the battery to the rest of the system.

The power controller is configured such that power from the secondary batteries, when placed in their respective slots, can supply power to either a load external to the system, or for internal components used for the fuel cell power system. In the latter case, this power is necessary during the start-up cycle of the fuel cell, after which the fuel cell power system can become self-sustaining. Examples of fuel cell power system loads include valves, air pumps, fuel pumps, and the like, as well as power for a fuel cell hydrogen supply, such as a reformer. The fuel cell system can comprise a unit operating directly from a liquid fuel, such as a direct methanol fuel cell (DMFC), or a hydrogen-supplied fuel cell which is fed from a chemical reactor or reformer, which converts a hydrogen-bearing liquid fuel into hydrogen gas, or from a source of stored hydrogen.

In a first embodiment, a DC-DC converter is coupled to the fuel cell, with the output of the converter connected to a rechargeable battery, which is inserted into the battery holder. In this embodiment the DC-DC converter may be used to directly control the state of charge of the rechargeable battery. The output side of the DC-DC converter, connected to the battery, can also be used to supply power to an external electrical load. In this case if the requirements of the load exceed the fuel cell capability, the battery will supply excess power to meet the needs of the load. Upon start-up, the battery power can be used to supply the energy needed to initiate operation of the fuel cell system. External power sources may also be connected to the system to recharge the battery. For instances where the system supplies power to an external load, an AC inverter may also be placed between the battery/DC-DC converter output and the load. This AC power may also be used to supply alternating current for components of the fuel cell power system.

In a second embodiment, multiple rechargeable batteries are part of the system, with respective multiple battery holders, power terminal attachments, and charge control circuit means. Each battery may, for example, have a charge control DC-DC converter, receiving power from the fuel cell power system. More preferably, however, is the use of a first DC-DC converter for establishing an output power bus from the fuel cell. This power bus can supply a source of regulated DC power for an external load (with or without an AC inverter), as well as a source of energy for the recharging circuits for each respective rechargeable battery. The recharging circuits for each battery may consist of an additional DC-DC converter, or a switching charge controller, for example. When the external load exceeds the capacity of the output power bus, the charging of the batteries may be reduced or halted, and in the latter case, the batteries may be connected to the output power bus to provide additional surge capacity to the external load.

Other embodiments, where the batteries may be recharged, and further supply a source of surge power for external loads, and start-up power for a fuel cell power system, may be arranged through combinations of switches, DC-DC converters, and the like, and such arrangements are specifically contemplated as being included herein. Releasable battery mounting means can include an access door which closes and latches to hold the batteries in place, or an access hatch which covers a releasable mounting system which in turn holds the battery in place.

DETAILED DESCRIPTION OF THE INVENTION

Figure 1:
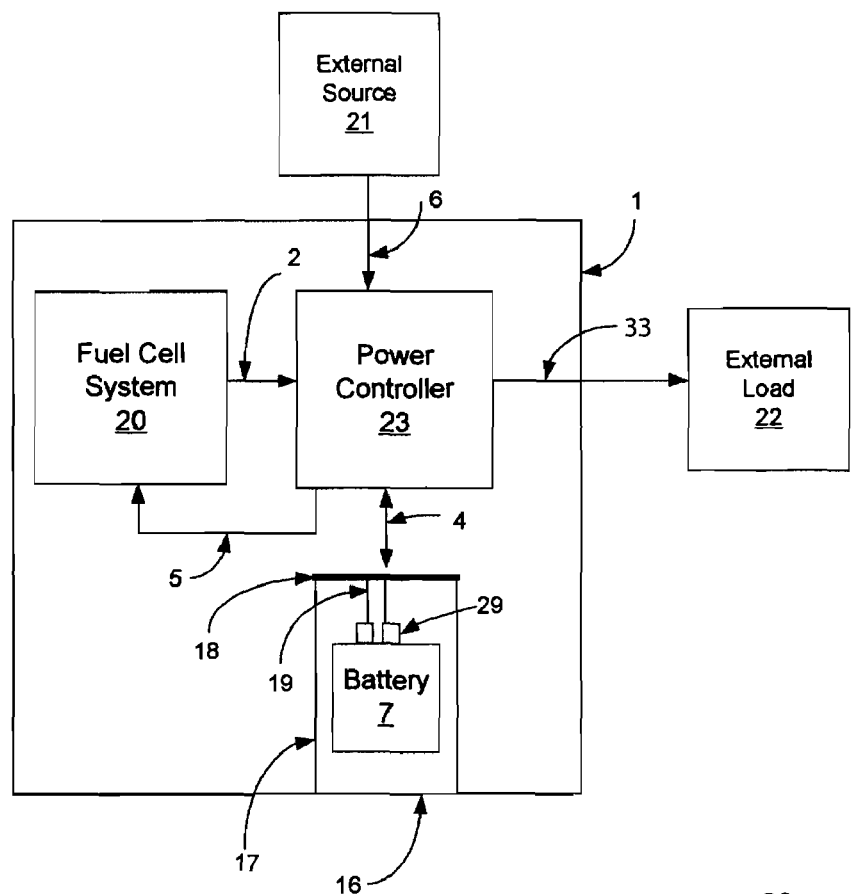
FIG. 1 is a schematic illustration of a fuel cell power system for recharging a battery incorporating a power controller and battery holder in accordance with the present invention.

FIG. 1 shows a general arrangement of a portable fuel cell battery charging and power system. Enclosure 1 houses the various parts of the system, with an at least one access opening 16 sufficient for the removal and replacement of secondary rechargeable battery 7 in a battery holder slot 17. At one end of battery holder slot 17 resides a connection header 18, with battery terminal connectors 19 for electrically connecting terminals 29 from battery 7 to the power controller 23 through power connection 4. See also FIG. 3. Power controller 23 maintains the state of charge of rechargeable battery 7 through power connection 4, as well as allowing for the power to flow out of battery 7 into the fuel cell system 20 through power connection 5 and to an external load 22 through power connection 33. Power controller 23 further regulates the power output of the fuel cell and the battery to provide either a stable DC source of power to external load 22 through power connection 33, or alternatively, AC power. Power from the fuel cell system 20 flows to the power controller 23 via power connection 2. Optionally, an external power source 21 may also be used to supply power through external power connection 6 to recharge the battery 7.

External load 22 is not limited to a load which is necessarily remote. For example, this embodiment may include a battery recharging fuel cell power system which is the primary source of electrical power for a scooter, where the load may consist of the electrical motor of the scooter, and the batteries are configured so that they may be accessed and replaced using the releasable mounting system described and illustrated herein.

Figure 2:
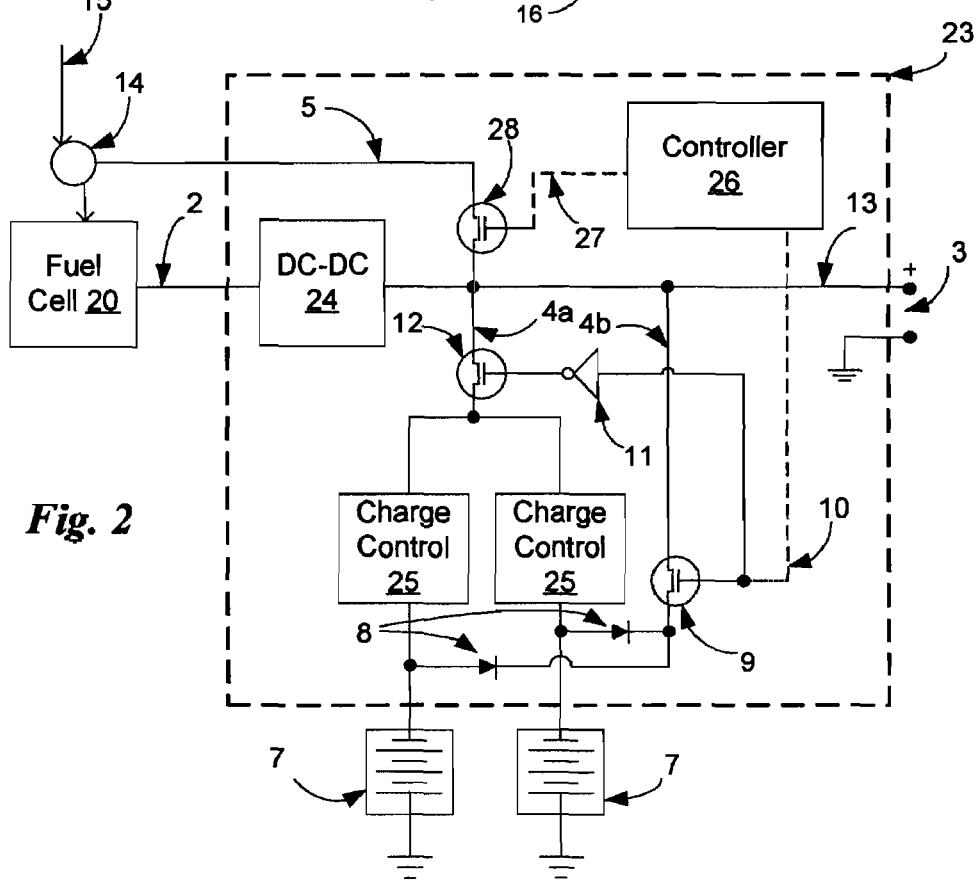
FIG. 2 is a more detailed illustration of the components of the power controller.

FIG. 2 shows a more detailed description of one embodiment of the power controller 23 of a portable fuel cell battery charging and power system. Fuel cell power system 20 has electrical components which must be powered for fuel cell operation, one of which is illustrated as fuel cell air supply pump 14 with a fuel cell air supply input line 15. Additional electrical components, not illustrated, are typically present. To start fuel cell operation, batteries 7 must supply power to fuel cell power system components such as air supply pump 14. This is accomplished via a start-up control circuit by allowing power to flow through transistor 9 by asserting control signal 10 from controller 26, and allowing the power to flow through transistor 28 into air pump power line 5, by also asserting control signal 27. At the same time, operation of battery charge control circuits 25 through battery charge control power supply line 4a is disabled by transistor 12, using control signal 10 inverted through logic inverter 11. This prevents batteries 7 from attempting to charge themselves through battery charge control 25, which would simply dissipate power. Diodes 8 prevent power flow into the batteries through battery discharge bus 4b, and isolate the batteries from each other. Once fuel cell power system 20 has become fully energized, and can supply power, control signal 10 can be de-asserted so that the power flowing into main bus 13 comes from the fuel cell 20 through DC-DC converter 24, and not batteries 7.

During normal battery charging operations power from main bus 13 flows through active transistor 12, and into charge control circuits 25. Charge control circuits 25 are well known in the art, and operate to maintain a proper state of charge of each individual battery 7. Charge control circuits 25 may be DC-DC converters or periodic switches, or any other commonly known circuit or device typically used to recharge a battery. Likewise, controller 26 may be a microprocessor or microcontroller such as a 68HC908AB32 microcontroller available from Freescale Semiconductor, Inc. of Austin, Tex.

Output power may be made available to an external load at output terminals 3. In the event that the external load exceeds the power available from the fuel cell during battery recharging, a power reduction circuit is employed to control the charge control circuits 25 to reduce the recharging rate of the batteries 7, either by receiving an external control signal, or by sensing output bus voltage 13. In the event that the fuel cell output cannot meet the requirements of the load, and the charge control circuits 25 are not sending power to the batteries 7, surge control signal 10 may be asserted so that the batteries 7 are coupled to the output bus 13 via a power supply circuit so that the batteries become coupled to the external load, and more power is made available to the external load. The embodiment is most useful as shown, when the voltage at output terminals 3 is closely matched to the battery voltage. For example, the output regulation of the DC-DC converter 24 may be 24 volts at output bus 13, where charge control circuits 25 are boost DC-DC converters for charging batteries 7 which are 24 volt batteries. Batteries 7 would thus be suited to coupling via diodes 8, transistor 9, and battery discharge bus 4b, to output bus 13 to feed a load connected at terminals 3. In this case diodes 8 would preferably be Schoffky barrier diodes to minimize the forward bias losses.

Figure 3:
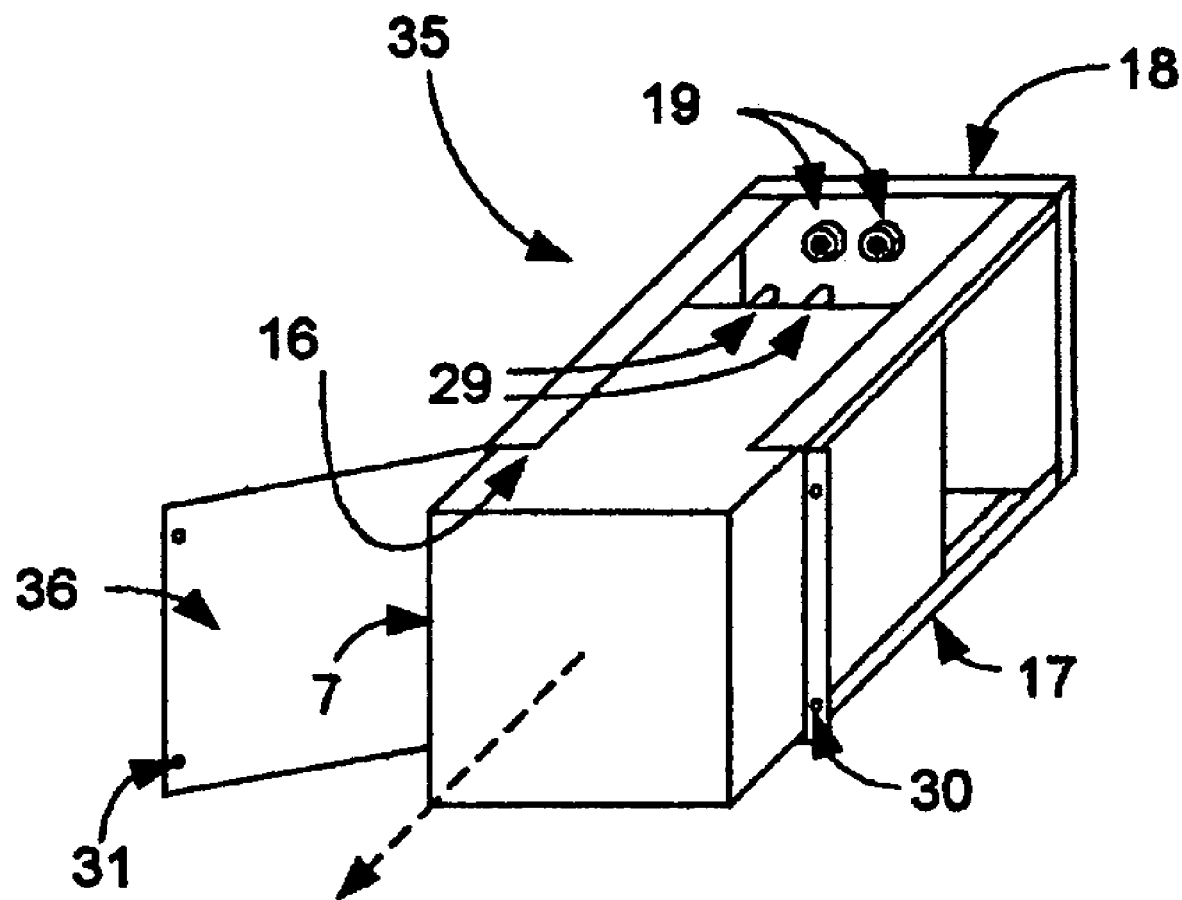
FIG. 3 is a more detailed illustration of the components of the battery holder.

FIG. 3 illustrates the rechargeable battery holder in further detail. The battery holder comprises a housing or cage-like enclosure, generally designated by the number 35 in FIG. 3, that includes a slot 17 for slidably and releasably receiving battery 7. Slot 17 is closed at one end by a connection header 18 and has an opening 16 at its opposite end which permits battery 7 to be inserted and removed from slot 17. A hinged door 36 may be used to close opening 16 and retain battery 7 in slot 17, or door 36 may be opened to allow access to opening 16 and slot 17 to permit insertion and/or removal of battery 7. Battery holder slot 17 is configured to receive battery 7, and to align battery terminals 29 so that when the battery is inserted into holder slot 17, battery terminals 29 will mate with battery terminal connectors 19, which are attached to connection header 18. When the battery has been fully inserted, door 16 may be closed and latching means comprising latches 31 on door 16 may be fastened to latch receivers 30 on holder 35, such that the battery 7 is locked securely into place in holder 17. Closing door 16 and fastening latches 31 effectively mounts battery 7 in a releasable fashion.

Other embodiments are possible, and can accomplished by arranging DC-DC converters, switches, and the like, for managing the flow of power to and from the fuel cell system, batteries, and to an electrical load. Other releasable latching means can be employed as well, where the latching mechanisms are separate from the door.

I claim:

1. A portable fuel cell power system configured to supply power to at least one external electrical device, said portable fuel cell power system comprising:

(a) an at least one fuel cell with a fuel supply, capable of generating electrical power;
(b) an at least one rechargeable battery; and
(c) a power bus electrically coupled to the output of said fuel cell, such that power flows from the fuel cell to the power bus; and
(d) a mating receptacle or plug for electrically coupling said at least one rechargeable battery to said power bus, where the electrical coupling is configured to allow for bidirectional power flow, into and out of the at least one battery; and
(e) an at least one output power receptacle, plug, or terminal coupled to said power bus, for the purpose of electrically connecting and supplying electrical power to at least one external electrical device; and
(f) an at least one electrical load within said portable fuel cell power system, said electrical load functional to maintain said portable fuel cell system in an operative state; and
(g) a power controller operative to control the flow of power between at least one of the power flow between said at least one rechargeable battery and said power bus, said fuel cell and said power bus, said power bus and said output power receptacle, plug, or terminal coupled to said power bus, for the purpose of electrically connecting and supplying electrical power to said external electrical device;

where said portable fuel cell power system has at least two operative states, comprising:

(h) when the sum of the power requirements of the at least one electrical load within said portable fuel cell power system and the power requirement of the at least one external electrical device exceed the output power capacity of the fuel cell, said at least one rechargeable battery supplies the difference in power needed by discharging into said power bus; and (i) when the output power capacity of the fuel cell exceeds the power requirements of the at least one electrical load within said portable fuel cell power system and the power requirement of the at least one external electrical device, said at least one rechargeable battery may be electrically coupled to said power bus in a charging capacity.

2. The fuel cell power system of claim 1 wherein said power controller comprises at least in part a DC-DC converter receiving power from said fuel cell and delivering power to said power bus.

3. The fuel cell power system of claim 2 wherein said DC-DC converter maintains the state of charge of the at least one rechargeable battery, and the at least one rechargeable battery is directly coupled electrically with said power bus.

4. The fuel cell power system as claimed in claim 3, where the power bus in the steady state is maintained at a DC voltage between 22 and 31 volts, and most preferably, at a float voltage compatible with at least one of NiMH, lead-acid, nickel-cadmium, or lithium ion battery.

5. The fuel cell power system of claim 1 wherein said power controller includes circuitry to allow for bidirectional power flow into or out of said at least one battery, where the state of charge of the at least one battery is maintained by said power controller when power flows into said at least one battery.

6. A fuel cell power system as claimed in claim 1, where the at least one rechargeable battery is inserted into an at least one mating slot, receptacle, plug, or holder, such that the at least one battery is held in a fixed position, where the mating slot, receptacle, plug, or holder further includes electrical connections to said at least one battery such that the at least one battery is electrically coupled to the system upon insertion into said slot, receptacle, plug, or holder.

\* \* \* \* \*